(12) United States Patent
Friske et al.

(10) Patent No.: US 7,530,264 B2
(45) Date of Patent: May 12, 2009

(54) TEST APPARATUS FOR ACCELERATED WHEEL AND SUSPENSION COMPONENT STRUCTURAL DURABILITY

(75) Inventors: Dave Douglas Friske, Royal Oak, MI (US); Laurence Edward Brown, Shelby Township, MI (US); John Max Gagern, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 11/695,313

(22) Filed: Apr. 2, 2007

(65) Prior Publication Data
US 2007/0261469 A1    Nov. 15, 2007

(51) Int. Cl.
  *G01M 17/02*    (2006.01)
(52) U.S. Cl. ................................................... 73/146
(58) Field of Classification Search ............... 73/146
  See application file for complete search history.

(56) References Cited

U.S. PATENT DOCUMENTS

| | | |
|---|---|---|
| 3,986,392 A | 10/1976 | Stiller et al. |
| 4,233,838 A | 11/1980 | Stiebel |
| 4,499,759 A | 2/1985 | Hull |
| 4,852,398 A | 8/1989 | Cargould et al. |
| 5,029,467 A | 7/1991 | Cargould |
| 5,111,687 A | 5/1992 | Hill |
| 5,777,219 A | 7/1998 | Popio et al. |
| 5,817,935 A | 10/1998 | Di Bernardo et al. |
| 5,911,164 A | 6/1999 | McRae |
| 5,979,231 A | 11/1999 | Lees, Sr. et al. |
| 5,992,227 A | 11/1999 | Jellison et al. |
| 6,016,695 A | 1/2000 | Reynolds et al. |
| 6,192,745 B1 | 2/2001 | Tang et al. |
| 6,772,626 B1 | 8/2004 | Engel et al. |
| 7,197,920 B2 | 4/2007 | Friske et al. |
| 2001/0042401 A1 | 11/2001 | Norres et al. |

FOREIGN PATENT DOCUMENTS

| | | |
|---|---|---|
| DE | 299 23 728 U1 | 8/2001 |
| WO | 2004/055489 A1 | 7/2004 |

*Primary Examiner*—Andre J Allen
(74) *Attorney, Agent, or Firm*—Frederick Owens; Brooks Kushman P.C.

(57) ABSTRACT

A test apparatus for testing a suspension element for a vehicle, including a wheel test spindle and a road simulation drum that is rotated by a motor is disclosed. The suspension element comprises a wheel and a tire. The wheel test spindle may be supported on a carrier assembly. The road simulation drum includes a chuck hole recess that may be provided in a replaceable module comprising a portion of the outer surface of the drum. The motor rotates the drum causing the tire and wheel to rotate on the test spindle to roll against the outer surface of the drum and through the chuck hole recess.

19 Claims, 3 Drawing Sheets

TEST APPARATUS FOR ACCELERATED WHEEL AND SUSPENSION COMPONENT STRUCTURAL DURABILITY

BACKGROUND OF THE INVENTION

1. Field of the Invention

The present invention relates to a test stand for accelerated testing of vehicle suspension components generally and focuses more particularly on testing the structural durability of vehicle wheels, tires, and other suspension components.

2. Background Art

Vehicles are extensively tested to verify compliance with durability standards and provide quality assurance. One vehicle durability test is known as a road durability test in which complete vehicle prototypes are driven on a variety of roads that provide different challenges to vehicle durability. Typical road durability tests may require 80 days of substantially continuous driving. This type of test is an excellent durability test and can provide valuable data to vehicle designers. One problem with this type of test is that it cannot begin until a prototype is fully constructed. Test results may not be available for an extended prior of time, potentially as long as or longer than 80 days, while the test is run.

Testing wheels in a road durability test is expensive and time consuming. Many vehicle families may offer 8 to 10 different wheel designs to provide model differentiation. Wheel and tire option packages are popular with consumers and add to the profit potential for new vehicle sales. Currently, original equipment manufacturers test vehicle wheels for quality assurance. One problem associated with testing 10 different wheels in long term road tests is that a large number of prototype vehicles are required for testing. Another problem is the substantial delay in obtaining approval of new wheels. Prototype vehicles are generally destroyed after road durability testing in the course of being deconstructed and analyzed. There is a substantial cost incurred when expensive prototype vehicles must be scrapped.

It is has been determined that the most damaging event for wheel road durability testing is a chuck hole impact. It is difficult to simulate accurately chuck hole testing in an accelerated test. Accelerated chuck hole testing requires simulation of a dynamic impact event which is a complex multi-variable simulation. While chuck holes in roads vary in size and shape, testing standards have been developed for simulating chuck hole impacts at various speeds. For example, chuck hole testing for driving at 30 miles per hour has led to the development of a standard chuck hole wherein a 4" depth chuck hole is provided that is 30" long. When a vehicle traveling at 30 miles per hour rides over the test chuck hole, the tire and wheel generally drop approximately 2" by the time the edge of the chuck hole is contacted by the tire. The tire does not generally bottom out in the chuck hole.

All parts of a vehicle suspension assembly can impact the performance of a wheel in a chuck hole impact event. In addition to testing wheels, chuck hole testing may be used to dynamically test shocks, springs and other suspension components. To improve vehicle suspension design, there is a need for an accelerated testing procedure that will facilitate suspension tuning prior to the availability of completed vehicle prototypes.

Accelerated testing may be conducted on vehicle test tracks that may be provided with chuck hole test areas. Reliable accelerated testing may be provided by placing a series of test chuck holes in a test track environment and passing a vehicle repeatedly over the series of chuck holes. Accelerated testing on a test track is less time-consuming and may be less expensive than road durability testing, but requires relatively expensive test track driving time. Testing for wheel durability on such a test track may require up to 10 days to develop reliable durability test results. This approach to accelerated testing is a destructive vehicle test and requires expensive prototype vehicles.

Radial test machines have been developed for wheel and tire testing. Radial test machines allow accelerated testing of wheels and tires at relatively high speeds. A tire and wheel may be instrumented with strain gauges and other sensors and run on a rotating drum that is driven by a relatively low torque motor in a radial test machine. Simulating a chuck hole impact on a radial test machine is difficult due to the severity of a chuck hole impact. Chuck hole impact simulation for durability testing may necessitate a 5,000 to 6,000 pound radial load impact that may occur with a frequency of two impacts per second on a radial test machine. Normal radial test machines under such test conditions would be expected to self-destruct.

One example of a test machine used to simulate an impact event is disclosed in U.S. Pat. No. 5,817,935. This patent discloses a test apparatus in which a wheel is rotated against a cylindrical drum or wheel that is provided with an obstacle having a relatively low profile. The wheel is supported on a hub that is rotated by a steering knuckle so that the tire remains in contact with the road wheel. If an obstacle equivalent to a 4" deep chuck hole were provided on the test apparatus disclosed in this patent, the test apparatus is expected to be damaged or destroyed. Another shortcoming of this device is that it is not capable of being used to test other suspension components.

Another approach to simulating impact resistance of a tire is disclosed in U.S. Pat. No. 3,986,392 wherein a plunger is periodically extended through a peripheral opening in a test wheel to cause an impact event on the tire. The tire is relatively rigidly supported on a frame as it engages the test wheel. The test device would not be expected to be able to withstand repeated impacts of the severity that could provide reliable wheel durability testing. This apparatus is also not capable of testing other suspension components dynamically.

There is a need for an accelerated wheel test that also may be used to test other suspension components. Such an accelerated test must provide reliable durability data to verify that a wheel suspension component is capable of withstanding rapidly repeated 5,000 to 6,000 pound radial loads representing simulated chuck hole impact events without damage to the test equipment. There is also a need for a reliable chuck hole impact event durability test apparatus that does not self-destruct.

There is a need for a reliable chuck hole impact event durability test apparatus that can be implemented on a single test fixture to test vehicle dynamic systems for a number of different vehicle lines. In addition, there is a need for a chuck hole impact event durability test apparatus that can withstand a high number of cycles without having to regularly replace components on the test apparatus.

The above problems with prior art durability testing and accelerated durability testing are addressed by applicant's invention as summarized below.

SUMMARY OF THE INVENTION

According to one aspect of the present invention, a test apparatus is provided for testing a wheel, or other suspension component for a vehicle. The test apparatus comprises a stationary support and a pair of rail assemblies provided on the stationary support. A carrier assembly is moveably assembled to the rail assembly. The carrier assembly includes a wheel test spindle that supports the wheel, and a tire mounted on the wheel. A road simulation drum has a chuck hole recess formed in an outer surface that is engaged by the tire. A motor rotates the drum and causes the tire and the wheel to rotate on the test spindle and roll against the outer surface of the drum and through the chuck hole recess. The carrier assembly is displaced in response to the wheel rotating through the chuck hole recess.

The above and other aspects of the invention will be readily apparent to one of ordinary skill in the art in view of the attached drawings and following detailed description of the illustrated embodiment.

DETAILED DESCRIPTION OF THE PREFERRED EMBODIMENT(S)

Figure 1:
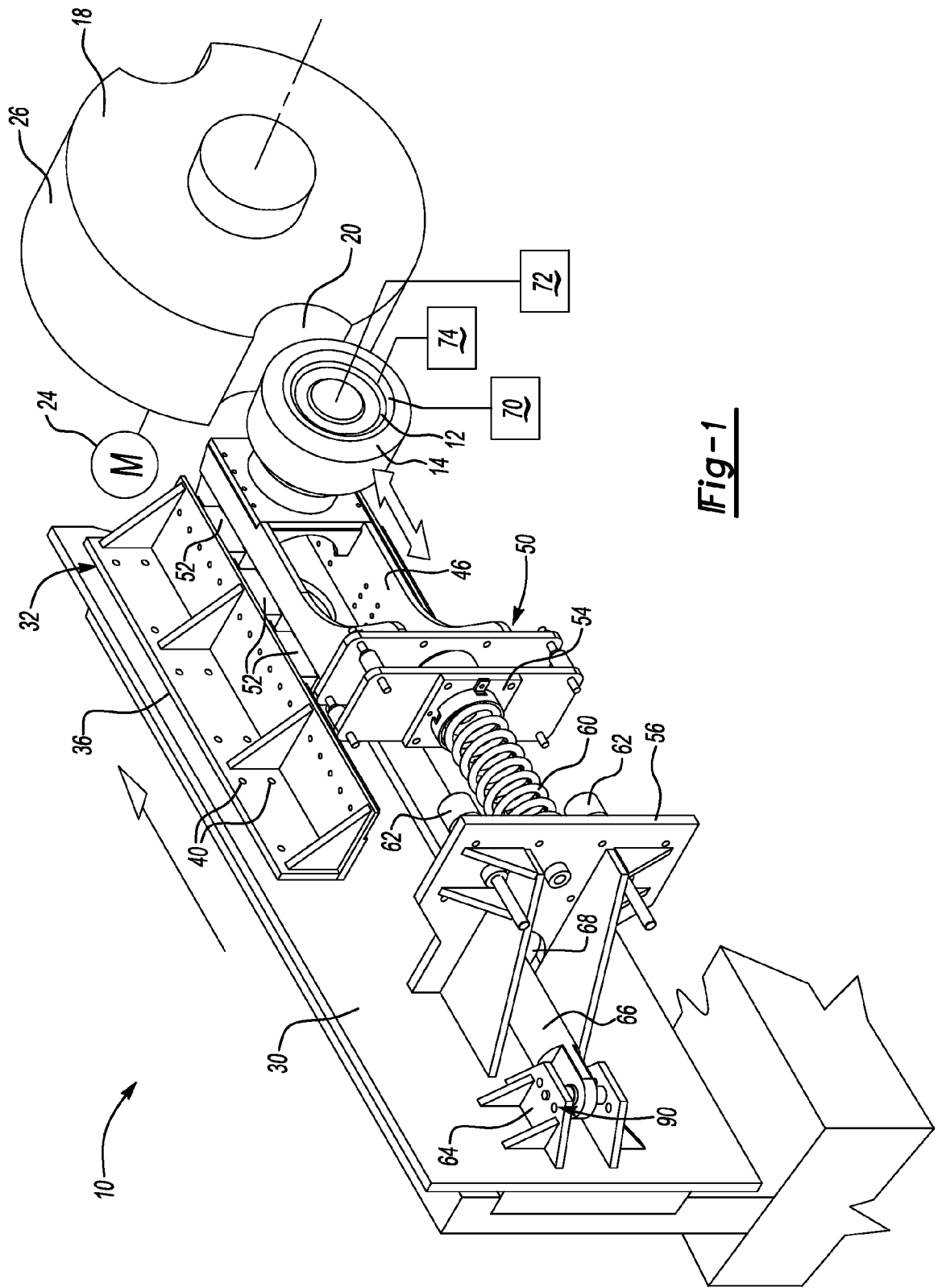
FIG. 1 is a fragmentary perspective view of a test apparatus made according to one embodiment of the present invention that is illustrated with a test wheel.
Figure 2:
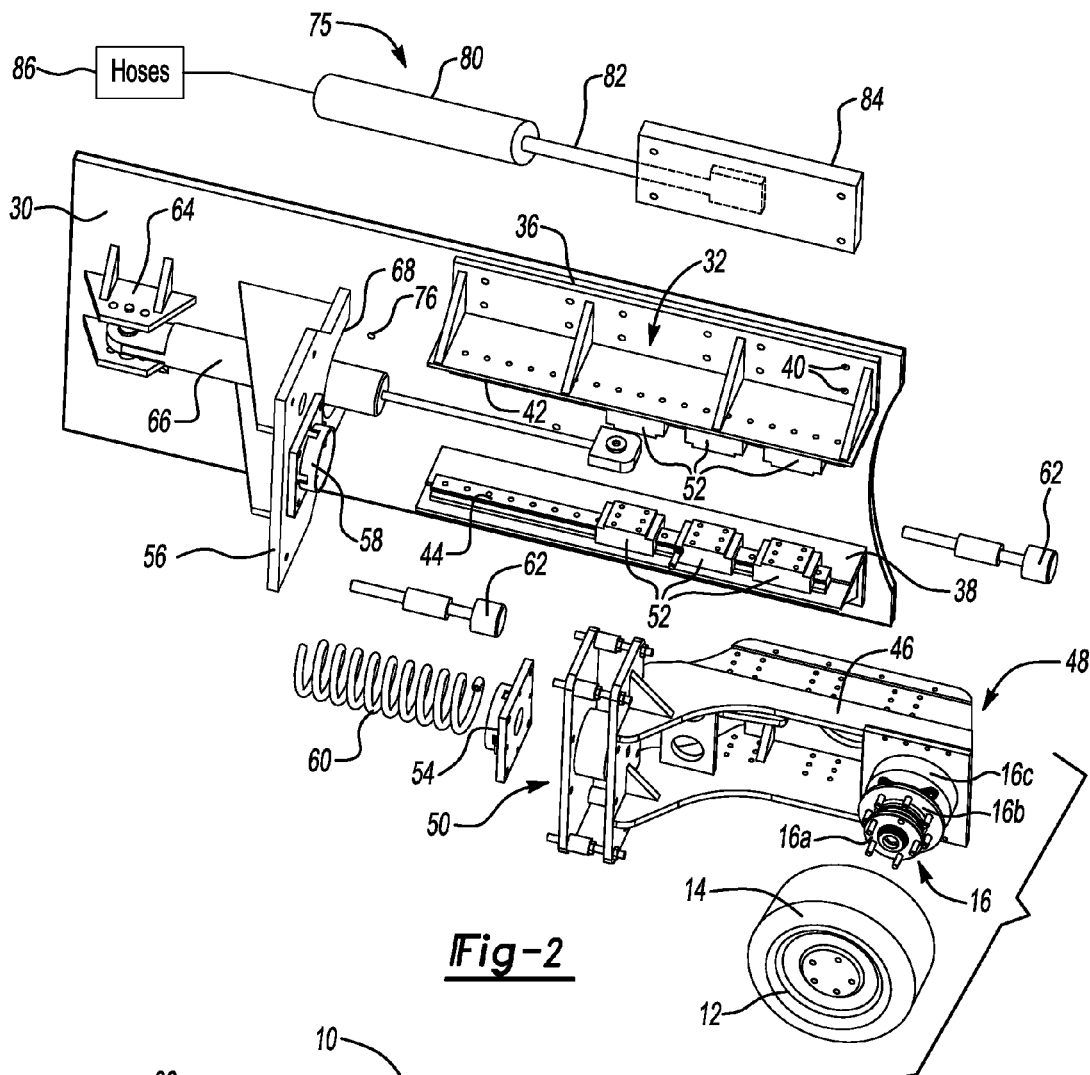
FIG. 2 is a fragmentary perspective exploded view of the test apparatus of FIG. 1.
Figure 3:
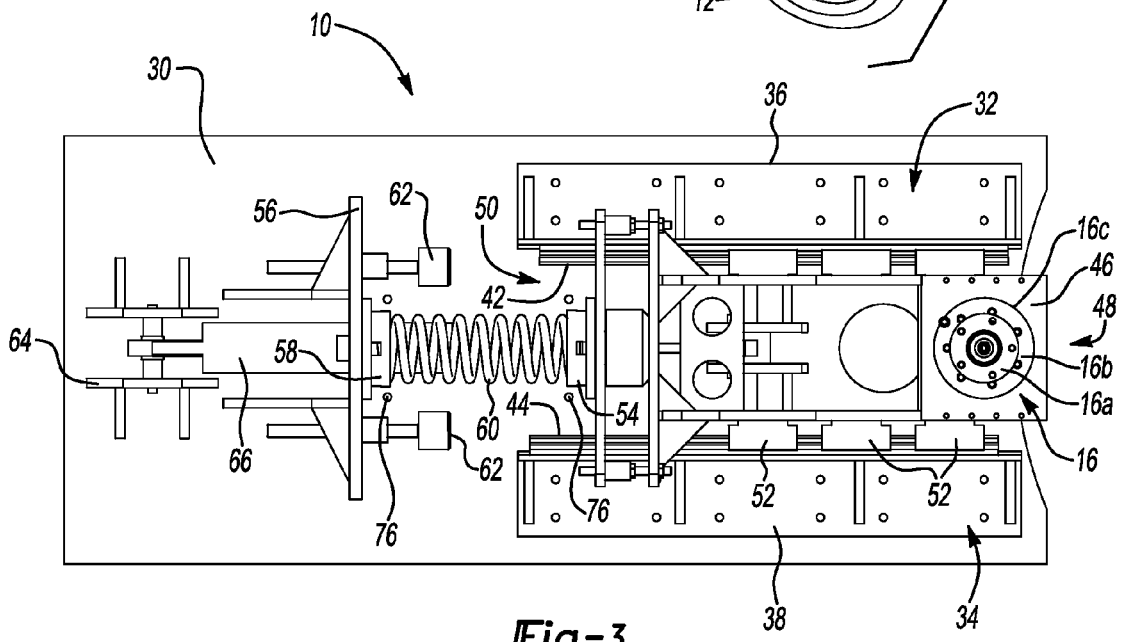
FIG. 3 is a side elevation view of the test apparatus of FIG. 1.
Figure 4:
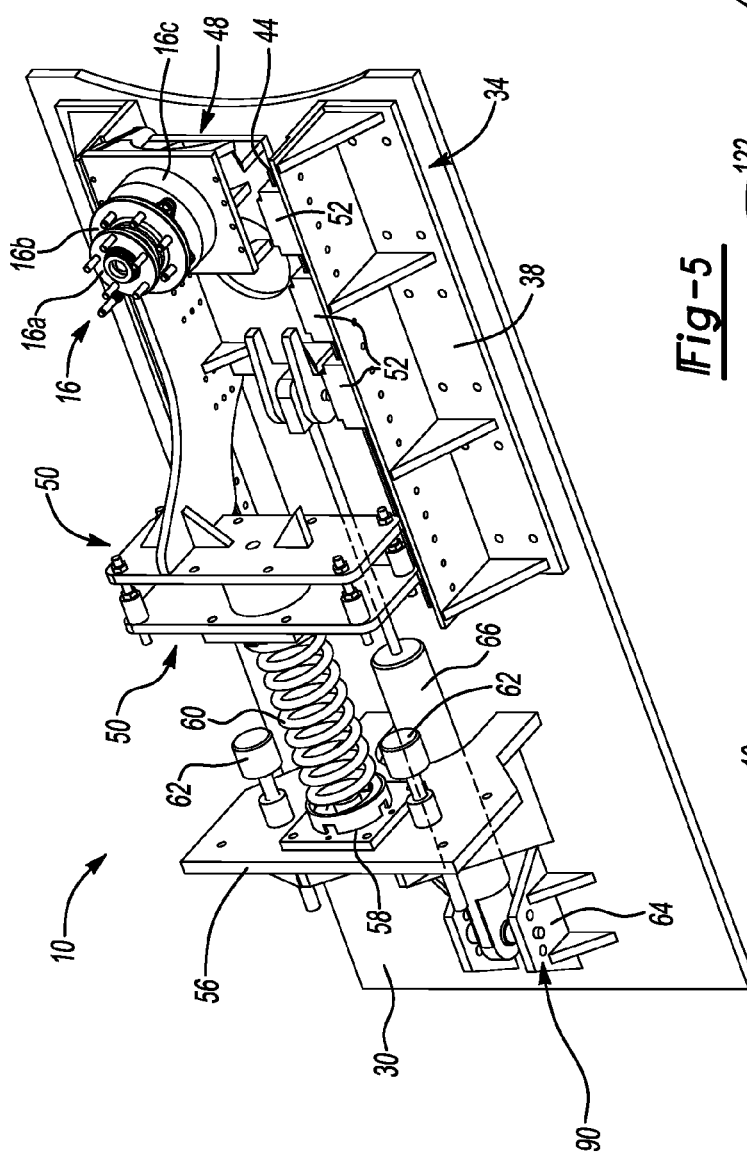
FIG. 4 is a fragmentary perspective view of the portion of the test apparatus attached to a stationary support.

Referring to FIGS. 1-4, a test apparatus is generally identified by reference numeral 10. The test apparatus 10 is used to test a wheel 12 and a tire 14 that are mounted on a wheel spindle 16. The wheel spindle 16 includes a two piece custom wheel hub 16a, 16b and a backing plate 16c. The wheel hubs 16a,16b are adapted to support and fit the wheel 12 to be tested by the test apparatus 10. The second wheel hub 16b is positioned between the first wheel hub 16a and the backing plate 16c and may have a diameter that is larger than the diameter of the first wheel hub 16a. The backing plate 16c is adapted to support the wheel hubs 16a, 16b and allow the wheel hubs 16a,16b to rotate on the test apparatus 100.

A road simulation drum 18 is provided with a chuck hole recess 20 that is part of a module 22 that is received in the road simulation drum 18. The chuck hole recess module 22 forms part of the outer surface 26 of the road simulation drum 18. The road simulation drum 18 is rotated by an electric motor 24. The tire 14 rides on the outer surface 26 of the drum 18 and rotates at a selected speed with the drum 18. The speed of rotation of the electric motor 24 may be adjusted to simulate impacts of the tire 14 and wheel 12 on the chuck hole recess 20 at different speeds.

The test apparatus 10 includes a stationary support 30. First and second rail assemblies 32,34 are assembled in a parallel relationship to the stationary support 30. The first and second rail assemblies 32,34 include a first and a second L-shaped bracket 36,38. The first and second L-shaped brackets 36,38 are removably coupled to the stationary support 30 with a plurality of fasteners 40. The first and second rail assemblies 32,34 support first and second rails 42,44 in a face-to-face orientation. The first and second rails 42,44 are removably coupled to the L-shaped brackets 36,38 and on a spaced relationship relative to the stationary support 30. While FIG. 1 illustrates the use of fasteners 40 to couple the rails 42,44 to the L-shaped brackets 36,38; additional embodiments may include an L-shaped bracket that is integrally formed with the rail.

The test apparatus 10 includes a carrier assembly 46 having right and left sides 48,50 as viewed in FIGS. 1-4. It should be understood that the right and left side designations may be reversed in other embodiments of the invention. The wheel test spindle 16 is generally disposed on the right side 48 of the first carrier assembly 46. At least one bearing block 52 is coupled to the carrier assembly 46 with fasteners 40. The bearing blocks 52 are used to slideably couple the carrier assembly 46 to the rails 42,44 and to allow the carrier assembly 46 to move toward and away from the drum 18 in response to the wheel rotating against the outer surface 26 of the drum 18 and the chuck hole recess 20. Movement of the carrier assembly 46 on the rail assemblies 32, 34 toward and away from the drum 18 simulates dynamic road conditions on the wheel 12 and tire 14 as they are exposed to the radial tangential forces exerted by the drum 18 and chuck hole recess 20. The bearing blocks 52 include a plurality of bearings (not shown) that facilitate sliding the carrier assembly 46 on the rails 42,44.

A first spring base 54 is coupled to the left side 50 of the carrier assembly 46. A base bracket 56 is coupled to the stationary support 30 and is disposed near the left side 50 of the carrier assembly 46. The base bracket 56 is generally centered with the carrier assembly 46 on the stationary support 30. A second spring base 58 is coupled to the base bracket 56 and is positioned opposite to the first spring base 54.

A spring 60 is coupled between the first and second spring bases 54,58. The type of spring 60 used in connection with the test apparatus 10 as illustrated is a conventional automatic coil spring. While the spring 60 is a coil spring, a leaf spring or coil spring selected to have the same spring rate as a leaf spring could also be used in connection with vehicle suspension systems.

The spring 60 may be replaced with two or more springs if needed. For example, if one spring was able to provide a spring rate of 600 lbs/sq. in. and such a spring was not easily obtainable, the test apparatus 10 may be adapted to use two springs that each provide a spring rate of 300 lbs/sq. in.

A plurality of jounce bumpers 62 are disposed on the base bracket 56 and are oriented toward the left side 50 of the carrier assembly 46. In one example, the jounce bumper 62 may be positioned within the spring 60. The jounce bumper 62 is an elastic cushion that is used to cushion impact between two metallic members as movement of the wheel compresses against the suspension. The height of jounce bumper 62 is adjustable to simulate the position of jounce bumpers on one or more vehicles.

An end bracket 64 is coupled to the stationary support 30 and is generally centered with the base bracket 56. A shock absorber 66 is coupled between the end bracket 64 and the left side 50 of the carrier assembly 46. The shock absorber 66 extends through an opening 68 in the base bracket 56. The end bracket 64 includes a plurality of slots 90. The slots 90 allow the shock absorber 66 to be mounted on the stationary support 30 at varying positions to account for different types of shock absorbers that may be used.

The shock absorber 66 is generally heavy duty to allow for high cycle testing and includes tunable compression and rebound rates to match the different rates used on a number of different vehicle lines. In one example, the shock absorber 66 may be a "Blackhawk" shock absorber that is manufactured by Bilstein, 14102 Stow Drive; Poway, Calif. 92064. Such a shock absorber is configured to withstand a large number of cycles with no degradation. The shock absorber 66 is cartridge based and is designed to prevent hydraulic fluid from leaking from the shock absorber 66 when used in a horizontal orientation.

A slip ring 70 may be disposed proximate to the tire 14 and provide rotating electrical contacts that can communicate data from strain gages and other sensors mounted on the wheel to a test analyzer 72. The strain gages may be used to correlate data relating to wheels and tires tested on a track and wheels and tires tested on the test apparatus 10. Electrical sensors 74 may be disposed proximate to the wheel 12 and the tire 14 to provide acceleration, load and tire pressure information related to the wheel 12 and tire 14 to the test analyzer 72.

The stationary support 30 is assembled to a hydraulic ram 75. The ram 75 includes a body 80, a piston 82, and a coupling 84 disposed on the rear side of the stationary support 30. A second set of fasteners 76 is used to assemble the stationary support 30 to the coupling 84. In one example, the coupling 84 may be welded to the rear side of the stationary support 30. The ram 75 holds the stationary support 30 and all of the associated components coupled to the stationary support 30 at a predetermined distance from the drum 18. The body 80 is generally anchored to the ground (not shown). A plurality of hoses 86 are coupled to the body 80 and provide hydraulic pressure and drain. The ram 75 uses such hydraulic pressure to move the stationary support 30 and hold the stationary support 30 at the predetermined distance from the drum 18.

The ram 75 may be adjusted to provide the requisite amount of space for suspension compression while the test is performed. The predetermined distance at which the ram 75 holds the stationary support 30 in relation to the drum 18 while the test is being performed corresponds to the extent of suspension compression that is needed to be achieved for a particular vehicle. For example, the suspension of a vehicle while driven on the road is generally exposed to a certain amount of suspension compression due to the weight of the vehicle. Such suspension compression may be calculated and used to establish the predetermined distance.

The test apparatus 10 is adapted to account for different suspension heights for a number of different vehicles. For example, the test apparatus 10 may perform wheel and tire durability testing on suspension heights for small passenger vehicles or for trucks. The suspension components (e.g., the spring 60, the jounce bumpers 62, and the shock absorber 66) are adapted to allow for more travel than the suspension components of a production vehicle.

While the suspension components allow for more travel than the suspension components actually used on a production vehicle, the spring rate of the spring 60, the height and position of the jounce bumpers 62, and the compression and rebound rates of the shock absorber 66 are adjusted to match the corresponding rates for a particular vehicle. For example, if a vehicle needed a spring 60 having a spring rate of 500 lbs/sq. in, such a spring 60 may be added to the test apparatus 10 to simulate the desire spring rate.

In another example, the shock absorber 66 may also be tuned to meet the corresponding rebound and compression rates for a particular vehicle. For example, the shock absorber 66 may include valve adjustments that correspond to high and low speeds for shock rebound, and high and low speeds for shock compression. By tuning the various valve adjustments of the shock absorber 66, the shock absorber 66 may be tuned to simulate the response of a particular shock absorber for a particular vehicle.

The test apparatus 10 may be used to test the durability of a number of suspension elements. Such suspension elements include the wheel 12, the tire 14, the spring 60, the jounce bumpers 62, and the shock absorber 66. In one example, the test apparatus 10 may be used to determine wheel 12 and tire durability 14.

In the course of the test, the drum 18 is rotated to a desired speed, once the desired speed of the drum has been reached, the ram moves the stationary support 30 toward the drum 18 and holds the stationary support 30 the predetermined distance from the drum 18. The tire 14 is rotated against the outer surface 26 of the drum 18. In response to the tire 14 engaging the drum 18, the spring 60 and the shock absorber 66 compress to the desired suspension compression. The tire 14 rotates against the outer surface 26 of the drum 18 and impacts the chuck hole recess 20 with each rotation of the drum 18 resulting in an impact that tests the durability of wheel 12 and tire 14.

As the tire 14 rotates into the chuck hole recess 20, the spring 60 and the shock absorber 66 rebound and the carrier assembly 46 slides on the rail assemblies 32, 34 in a direction toward the drum 18. As the tire 14 rotates out of the chuck hole recess 20 and onto the outer surface 26 of the drum 18, the spring 60 and the shock absorber 66 compress and the carrier assembly 46 slides on the rail assemblies 32, 34 in a direction away from the drum 18.

To test the jounce bumper 62, the height of the jounce bumper 62 may be adjusted to the height of a jounce bumper that is representative of a particular vehicle. As the tire 14 rolls out of the chuck hole recess 20, the resulting compression of the spring 60 and the shock absorber 66 forces the right side 50 of the carrier assembly 46 to impact the jounce bumper 62. The structural integrity of the jounce bumper 62 may be assessed in response to such an impact.

The road simulation drum 18 is shown with module 22 that defines the chuck hole recess 20. It should be understood that the module 22 could be removed and replaced by a module having a different sized chuck hole recess or by a smooth plate if it is desired to use the test apparatus 10 to simulate operation on a smooth road.

The test apparatus 10 duplicates the rate of travel of the wheel 12 and tire 14 into the chuck hole recess 20 to assess the severity of the initial impact between the wheel 12 and the tire 14. The test apparatus 10 tests the cord strength of the tire 14 and the structural integrity of the wheel 12. The test apparatus 10 also duplicates the rate of the suspension response via the spring rate of the spring 60 and the rebound and compression rates of the shock absorber 66 to control the amount of energy that is being absorbed by the wheel 12 and the tire 14. The compression and rebound rates selected for the shock absorber 66 and the spring rate selected for the spring 60 are generated in response to determining varying weights of corner loads that need to be supported by the suspension for a particular vehicle.

The test apparatus 10 may also be used to test a particular shock absorber. For example, the shock absorber 66 can be replaced with a specific shock absorber that is to be tested for a particular vehicle. In such a case, the resistance of the shock absorber may be tested while performing long term chuck hole testing with the test apparatus 10.

Figure 5:
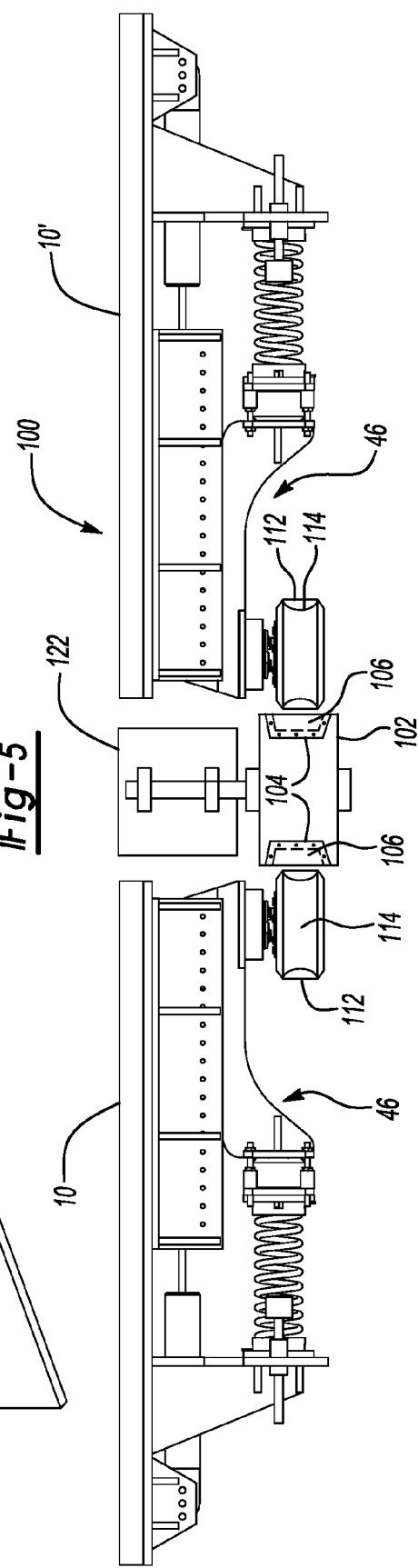
FIG. 5 is a top plan view of a dual test apparatus made according to another embodiment of the present invention wherein two tire and wheel assemblies may be tested simultaneously on a wheel machine having a road simulation drum including a chuck hole module according to another embodiment of the invention.

Referring to FIG. 5, a double test apparatus is generally indicated by reference numeral 100. The double test apparatus includes a first test fixture 10 and a second test fixture 10'. The double test apparatus 100 has a road simulation drum 102 that is provided with a chuck hole module 104 that defines a chuck hole recess 106. The test fixtures 10,10' are disposed on opposite sides of the drum 102.

The double test apparatus includes first and second wheel spindles 108,110. A first wheel spindle 108 and a second wheel spindle 110 are provided on opposite sides of the drum 102. The component parts of the first and second wheel spindles 108 and 110 may be generally identical and the same reference numerals will be used to refer to corresponding parts of each. A tire 114 and wheel 112 are supported on the wheel spindles 108,110. The wheel spindles 108,110 are supported by the carrier assembly 46.

The carrier assembly 46 may be slideably coupled to the first and second rail assemblies 32,34. Each side of the double test apparatus may include the first and second spring bases 54,58, the base bracket 56, the spring 60, the end bracket 64 and the shock absorber 66 as previously identified with reference to FIGS. 1 and 2.

The double test apparatus 100 provides the ability to test two similar or different suspension systems at the same time. The motor 122 rotates the drum 102 and the tires 114 and wheels 112 and brings the tires 114 into contact with the chuck hole recess 106 with every rotation of drum 102. The double test apparatus provides a reliable simulation of repetitive chuck hole impact on two different wheels at the same time. For example, a user may select the corresponding wheel hub 16a,16b; spring 60; shock absorber 66; wheel 112 and tire 114 on one side of the apparatus 100 that is different from the wheel hub 16, 18, spring 60, shock absorber 66, wheel 112 and tire 114 on the opposite side of the apparatus 100 to test two different sets of suspension components at the same time.

While the best mode for carrying out the invention has been described in detail, those familiar with the art to which this invention relates will recognize various alternative designs and embodiments for practicing the invention as defined by the following claims.

What is claimed:

1. A test apparatus for testing a suspension element of a vehicle, the test apparatus comprising:
    a stationary support;
    a pair of rail assemblies provided on the stationary support;
    a carrier assembly slideably assembled to the rail assemblies, the carrier assembly having a wheel test spindle that supports a wheel, and a tire mounted on the wheel, wherein the carrier assembly includes right and left sides and the wheel test spindle is disposed on the right side of the carrier assembly;
    a base bracket disposed adjacent the left side of the carrier assembly;
    a road simulation drum having an outer surface that is engaged by the tire, and a chuck hole recess formed in the outer surface; and
    a motor rotates the drum to cause the tire and the wheel to rotate on the test spindle, the tire rolls against the outer surface of the drum and through the chuck hole recess, the carrier assembly slides on the rail assemblies in response to the displacement of the wheel as the tire and wheel rolls on the drum and through the chuck hole recess.

2. The test apparatus of claim 1, wherein each rail assembly is positioned in parallel with one another on the stationary support and each rail assembly comprises an L-shaped bracket coupled to the stationary support.

3. The test apparatus of claim 2, wherein each rail assembly further comprises a rail coupled to each L-shaped bracket and the carrier assembly is slideably received by the rails.

4. The test apparatus of claim 3, wherein the carrier assembly further comprises at least one pair of blocks and each block is positioned in parallel on the stationary support from one another, the at least one pair of blocks comprise at least one bearing disposed therein to allow the carrier assembly to be moveable on the rails in response to the displacement of the wheel as the tire and the wheel rolls on the drum and through the chuck hole recess.

5. The test apparatus of claim 1, further comprising at least one spring coupled to the base bracket and to the left side of the carrier assembly.

6. The test apparatus of claim 1, further comprising at least one jounce bumper coupled to the base bracket and orientated toward the left side of the carrier assembly, wherein the height and position of each jounce bumper is adjustable to simulate the height and position of a jounce bumper on a particular vehicle.

7. The test apparatus of claim 1, further comprising an end bracket coupled to the stationary support and disposed adjacent to the base bracket and a shock absorber having tunable properties coupled between the end bracket and the left side of the carrier assembly.

8. The test apparatus of claim 7, wherein the base bracket includes an opening positioned adjacent the stationary support to allow the shock absorber to pass through the base bracket and to allow the shock absorber to be coupled to the left side of the carrier assembly.

9. The test apparatus of 7, wherein the shock absorber is a cartridge based device.

10. The test apparatus of claim 7, wherein the shock absorber comprises one or more rebound and compression rates to allow the shock absorber to be used with one or more vehicles.

11. The test apparatus of claim 1, further comprising at least one sensor disposed on the wheel to provide acceleration, load and tire pressure information for the tire.

12. The test apparatus of claim 1, further comprising a ram assembled to the stationary support, the ram is adapted to move the stationary support and hold the stationary support a predetermined distance away from the drum and the chuck hole recess as the tire and wheel rolls on the drum and through the chuck hole recess.

13. The test apparatus of claim 1, wherein the wheel test spindle is a first wheel test spindle, the test apparatus further comprising a second wheel test spindle disposed at a diametrically opposed location relative to the first wheel test spindle that supports a second wheel and a second tire mounted on the second wheel for rotation, wherein the outer surface of the road simulation drum is engaged by the second tire that rotates on the test spindle and rolls against the outer surface of the drum and through the chuck hole recess to simulate the second tire and second wheel rolling over the chuck hole in the road.

14. A test apparatus for testing a suspension element, the test apparatus comprising:
    a stationary support;
    a pair of rail assemblies provided on the stationary support;
    a carrier assembly movably assembled to the rail assemblies, the carrier assembly having a wheel test spindle that supports a wheel, and a tire mounted on the wheel;
    a plurality of suspension components assembled to the stationary support;
    a road simulation drum having an outer surface that simulates a road surface is engaged by the tire; and
    a motor rotates the drum to cause the tire and the wheel to rotate on the test spindle and against the drum, the carrier assembly moves on the rail assemblies in response to the displacement of the wheel as the tire rolls on the drum, wherein the suspension components are calibrated to simulate one of a plurality of vehicles selected.

15. The test apparatus of claim 14, wherein the suspension components further comprises a shock absorber having selectable rebound and compression rates to allow the shock absorber to be used for the plurality of vehicles.

16. The test apparatus of claim 14, wherein the suspension components further comprises at least one jounce bumper that is adjustable in height.

17. The test apparatus of claim 14, wherein the suspension components further comprises at least one spring capable of having a predetermined spring rate.

18. A test apparatus for testing a wheel for a vehicle, the test apparatus comprising:
  a stationary support;
  a rail assembly provided on the stationary support;
  a carrier assembly movably assembled to the rail assemblies, the carrier assembly having a wheel test spindle that supports the wheel, and a tire mounted on the wheel;
  a spring having a predetermined spring rate assembled to the stationary support and the carrier assembly; and
  a shock absorber having tunable properties assembled to the stationary support and the carrier assembly;
  a road simulation drum having an outer surface that is engaged by the tire;
  a ram assembled to the stationary support, the ram is adapted to move the stationary support relative to the road simulation drum, locate the stationary support a predetermined distance away from the drum and compress the spring and the shock absorber to reach a desired compression rate for one of a plurality of vehicles selected; and
  a motor rotates the drum to cause the tire and the wheel to rotate on the test spindle, the tire rolls against the outer surface of the drum and through the chuck hole recess, the spring and the shock absorber compress and rebound in response to the tire and the wheel rolling on the drum and through the chuck hole recess causing the carrier assembly to move on the rail assembly.

19. The test apparatus of claim 14 wherein the carrier assembly is slideably assembled to the rail assemblies and the carrier assembly slideably moves on the rail assemblies in response to the displacement of the wheel as the tire rolls on the drum.

* * * * *